Figure 1:
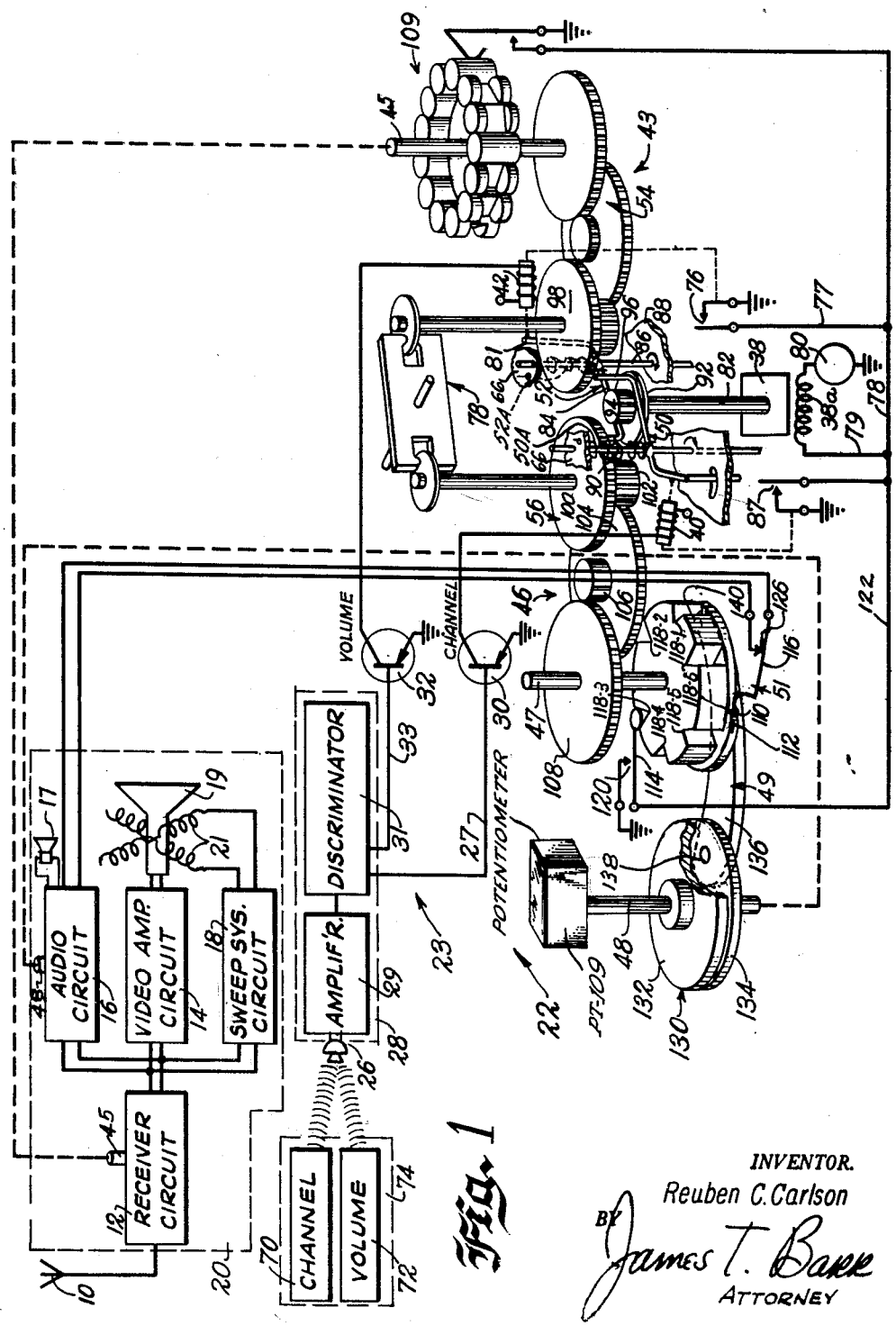

INVENTOR.
Reuben C. Carlson
ATTORNEY

April 27, 1965   R. C. CARLSON   3,181,052
BELL CRANK DRIVE

Filed April 3, 1961   2 Sheets-Sheet 2

INVENTOR.
Reuben C. Carlson
BY James T. Barr
ATTY.

United States Patent Office 3,181,052
Patented Apr. 27, 1965

3,181,052
BELL CRANK DRIVE
Reuben C. Carlson, Bensenville, Ill., assignor to Admiral Corporation, Chicago, Ill., a corporation of Delaware
Filed Apr. 3, 1961, Ser. No. 100,282
9 Claims. (Cl. 318—460)

The present invention relates to control systems for controlling the operation of an electrical circuit means and, more particularly, relates to a new and improved control system operable by energy signals radiated from a remotely positioned transmitter means.

The present invention is specifically an improvement over the control system disclosed and claimed in the Carlson application Ser. No. 820,468, filed June 15, 1959, now Patent No. 3,075,400.

The new and improved control system has particular utility in remotely controlling selected ones of the control functions of the signal receiving unit. Although the invention is described in connection with a wave signal receiver, it should not be construed as being limited or restricted to this use since the invention has a wide variety of applications in other types of electrical apparatus.

It is an object of the present invention to provide a new and improved control system for remotely controlling an electrical circuit means.

It is another object of the present invention to provide a new and improved control system wherein the operative condition of a selected control function of an electrical circuit means can be remotely changed.

It is yet a further object, in accordance with the previous object, to provide a new and improved driving connection between a prime mover means and an electrical element associated with a selected control function.

It is another object in accordance with the previous object to provide between the prime mover means and a selected one of the electrical elements a driving connection which restricts movement of the selected element to a limited range.

It is yet a further object of the present invention to provide in a remote control system a driving connection that prevents a control element associated with a control function from being moved beyond its operative range.

The above and other objects are realized in accordance with the present invention by providing for an electrical circuit means a new and improved remote control system comprising a control system adapted to be actuated by energy signals radiated from a transmitter. The electrical circuit means comprises, for example, a wave signal receiver, i.e. a television receiver, having a control element associated with a control function, for example, volume, fine tuning, or brightness. In one aspect of the present invention, the control system operates in response to energy signals radiated by the transmitter to drivingly connect a prime mover means to the control element, thereby changing the operative condition of its associated control function. Successively radiated energy signals cause the control element to be moved into successive positions, thereby further changing the operative condition of the control function. In order to prevent damage to the control element as a result of it being moved beyond its operative range, provision is made in the driving connection between the prime mover means and the control element for confining the movement of the control element within a range less than its operative range.

The invention, both as to its organization and method of operation, taken with further objects and advantages thereof, will best be understood by reference to the following description taken in connection with the accompanying drawings, in which:

FIG. 1 is a diagrammatic view of a remote control system embodying the principles of the present invention; and FIGS. 2, 3, 4, and 5 are fragmentary top plan views partially in section showing volume control portions of the remote control system of FIG. 1 in various operative positions.

Referring now to the drawings and in particular to FIG. 1, a remote control system embodying the features of the present invention is illustrated diagrammatically and may be identified as a two-button remote control system. The remote control system is used to control the operation of an electrical circuit means, for example, a television receiver, and comprises a portable transmitter adapted to generate energy signals, hereinafter called ultra-sonic signals, means for detecting these signals, and means responsive to the detected signals. The control system is adapted to change the operative condition of one of a plurality of control functions of the television receiver. For illustrative purposes, two control functions of the television receiver are illustrated as being controlled by the remote control system, one of the control functions being channel selection and the other being volume. It should be understood that more than two control functions can be controlled by the system of the present invention and, further, control functions other than channel selection and volume can be remotely controlled by the system of the present invention.

Briefly, a control system embodying the principles of the present invention is generally identified by reference numeral 22 and comprises a remotely positioned transmitter 74 for radiating ultra-sonic signals detected by control circuits 23. The control circuits are preferably located adjacent to electrical circuit means, for example, a conventional television receiver 20. The transmitter is a conventional acoustical transmitter which is manually operable to develop two distinguishable energy signals of predetermined magnitude and frequency. These ultra-sonic signals are detected by a microphone 26 located in the control circuits 23. The microphone converts the ultra-sonic signals into electrical signals having frequencies respectively corresponding to the frequencies of the ultra-sonic signals. The electrical signals are coupled to a selective amplifier network 28 including an amplifier circuit 29 and a discriminator circuit 31.

In order to change channels or tune the receiver to a different station, a first ultra-sonic signal is radiated from the transmitter, with the result that the discriminator causes a conductor 27 to be energized, thereby to render conductive a normally nonconductive channel transistor 30. The conductive transistor 30 effects the energization of a channel relay 40 which renders a driving connection 46 inoperative and, conversely, conditions a driving connection 43 for operation. Simultaneously, the channel relay 40 energizes a prime mover, for example, a unidirectional electric motor 38 to render the driving connection 43 operative. The driving connection 43 includes a gear train 54 interconnecting the motor 38 and a main tuning shaft 45. Although the ultra-sonic signal is terminated, the main tuning shaft 45 is rotated under the control of a tuner programming arrangement 109 which is identical to the arrangement described in the above identified Carlson application.

To increase the sound level of the receiver, a second ultra-sonic signal is radiated from the transmitter 74, to cause the discriminator 31 to energize the conductor 33, thereby to render conductive a normally nonconductive volume transistor 32. The conduction of the transistor 32 causes a volume relay 42 to be energized with the result that the driving connection 43 is rendered inoperative and the driving connection 46 is conditioned for operation. Simultaneously, the volume relay 42 energizes the motor 38 to render the driving connection 46 operative. The driving connection 46 includes a gear train 56 interconnecting the motor 38 and a crank mechanism 49. The crank mechanism 49 drivingly engages a volume potentiometer shaft 48 of potentiometer PT-109 in the television receiver. Although the second ultra-sonic signal is terminated, the potentiometer shaft 48 is rotated under the control of a volume programming arrangement 51. Hence, in response to transmission of either the first or second ultra-sonic signal, the motor 38 is rendered operative and a driving connection is obtained between the motor 38 and either the main tuning shaft 45 or the volume potentiometer shaft 48.

The television receiver 20, which is controlled by the remote control system 22, comprises an antenna 10 coupled to the receiver circuits 12 comprising the usual radio-frequency amplifier section, a station selector section including the main tuning shaft 45 and a fine tuning arrangement, a first detector section, an intermediate frequency-amplifier section, and a second detector section. As shown, the output of the receiver circuit 12, i.e. the output of the second detector section, is coupled to a video amplifier circuit 14, an audio circuit 16, and a sweep system circuit 18. The output of the video amplifier circuit 14 is coupled to an electron gun embodied in a cathode ray tube 19, while the output of the sweep system circuit 18 is coupled to a deflection yoke in the cathode ray tube 19, illustrated diagrammatically by coils 21. The output of the audio circuit 16 is coupled directly to a conventional loudspeaker 17, the sound level of which is controlled by adjustment of a potentiometer shaft 48. Since the construction and operation of television receiver 20 is well known and comprises no part of the present invention, a description of its operation is not included herein.

The transmitter 74 possesses a pair of resonator rods individually identified as a channel rod 70 and a volume rod 72 suitably supported for maximum resonance. Each of the resonator rods 70 and 72 is adapted to be shock excited by a suitable manually-operable hammer to produce an ultra-sonic signal having a frequency corresponding to the length and/or configuration of the rod; the frequencies of the resonator rods 70 and 72, for example, are preferably 38.285 kc. and 40.805 kc. Each of the ultra-sonic signals is detected by the microphone 26 embodied in the input circuit of the control system 23. The mechanical energy of the ultra-sonic signals are respectively converted into electrical signals having the same frequencies as the ultra-sonic signals. These A.C. electrical signals are coupled to the amplifier network 28 and, particularly, to an amplifier 29 which amplifies the signals developed by the microphone 26. The amplified electrical signals are fed into the discriminator 31 which causes, in response to the first ultra-sonic signal, a D.C. pulse to be supplied to the conductor 27 and, in response to the second ultra-sonic signal, a D.C. pulse to be supplied to the conductor 33. The conduction of either of the transistors 30 and 32 causes the energization of the channel relay 40 or volume relay 42, which are located in the emitter collector circuit of the transistors 30 and 32, respectively.

In view of the fact that the channel relay 40, motor 38, driving connection 43, and programming arrangement 109 are described structurally and functionally in detail in a co-pending application, Serial Number 99,166 filed March 29, 1961, by R. C. Carlson now Patent No. 3,121,343, it is deemed unnecessary to repeat such a description in this application. However, in order to provide a background for understanding the present invention, a limited description of the volume relay 42, motor 38, and driving connection 46 is set forth.

Assuming that the volume resonator rod 72 is actuated to radiate an ultra-sonic signal, as described above, the volume relay 42 is energized to perform the following two functions: First, it moves an actuator 52 into an inoperative position to condition the driving connection 46 for operation. The actuator 52 is normally spring biased into the position shown by a dual acting coil spring 52A (one end of which is secured to frame member 66 and the other end to actuator 52) and comprises a vertical portion 86 rotatably and slidably supported from frame members 88 and a horizontal body 84 having an armature end 81. The actuator 52 bears against a drive collar 92 on the shaft 82 of the motor 38. In response to energization of the relay 42, the armature end 81 is attracted to the relay 42 thereby causing the vertical portion 86 to rotate and the horizontal body 84 to move away from the drive shaft 82. As a result, a tip 90 extending vertically upward from the end of the body 84 is moved out of the path described by the drive collar 92 during axial movement of the shaft 82. A pinion 94 mounted on shaft 82 immediately above collar 92 is adapted for engagement with gear trains 54 and 56. Second, the relay 42 closes contacts 76 to complete an energizing circuit for the motor 38, as follows: ground, contacts 76, conductor 77, conductor 78, conductor 79, motor control winding 38a, A.C. source 80, and ground. Incident to energization of the motor 38, its drive shaft 82 simultaneously rotates in a predetermined direction, for example, counterclockwise as viewed in the top of FIG. 1, and moves axially upward, as seen in FIG. 1. Accordingly, the drive collar 92 abuts against the bottom of another actuator 50 which is normally biased into the path of the drive collar 92 by coil spring 50A (one end of which is secured to frame member 66 and the other end to actuator 50). Of course, since the actuator 52 is in its operative position, it is not engaged by the drive collar 92. Hence, assuming that an input gear 98 of the gear train 54 is in its lower operative position (not the position shown), the tip 96 of the actuator 50 engages and moves upwardly the gear 98. Since the gear 98 is connected to a pivotal assembly 78, the assembly 78 is actuated to move an input gear 100 of the gear train 56 into its downward position (as shown). As a result, the upwardly moving drive pinion 94 moves into driving engagement with the downwardly moving input gear 100 to effect a driving connection from the motor 38 through the gear train 56 to an idler shaft 47 as follows: the drive pinion 94, the input gear 100, an integral gear 102, an idler gear 104, an integral gear 106, and a spur gear 108 fixedly secured to the idler shaft 47. Since the drive shaft 82 of the motor 38 rotates in a counterclockwise direction, the spur gear 108 rotates in a clockwise direction. The idler shaft 47 is connected to the potentiometer shaft 48 through the crank mechanism 49, and it is additionally controlled by the operation of the volume programming arrangement 51.

In contrast to the operation of the control system disclosed in the Carlson application Ser. No. 820,468 now Patent No. 3,075,400, wherein the potentiometer shaft is incrementally adjusted in accordance with the time duration of an ultra-sonic signal, the control system embodying the features of the present invention causes the volume potentiometer shaft 48 to be moved into one of a plurality of discrete angular positions to produce one of the following sound conditions: off, mute, low, medium-low, medium, and high. In addition, since potentiometers presently used in television receivers have an operative range of only approximately 300 degrees, the potentiometer shaft is rotated through a range having less than 300 degrees. Thus, in accordance with the present invention, provision is made for limiting the movement of the potentiometer shaft through a range of less than 300 degrees. To this end, the crank mechanism 49 translates the rotary movement of the idler shaft 47 into what might be called a reciprocal-rotary movement. Actually, the crank mechanism 49 functions to move the potentiometer shaft 48 120 degrees in a forward direction and then 120 degrees in a reverse direction during a 360 degree rotation of the idler shaft 47.

Figure 2:
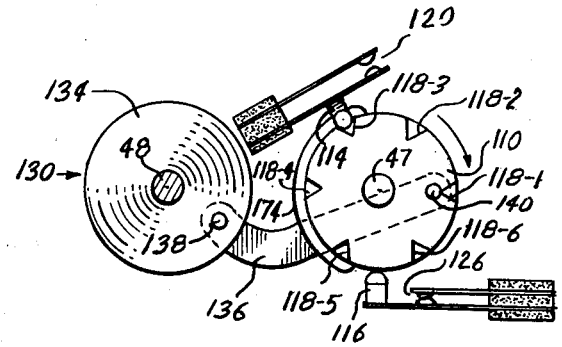
Figure 3:
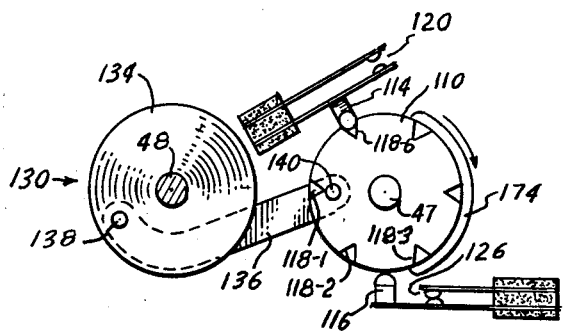
Figure 4:
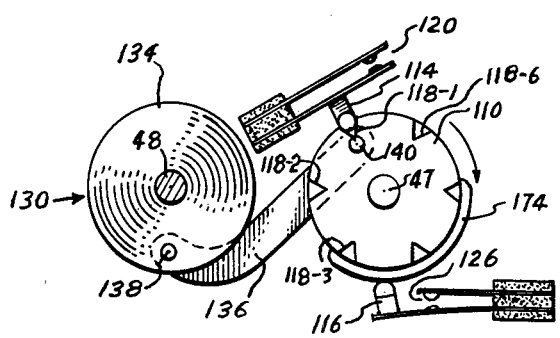
Figure 5:
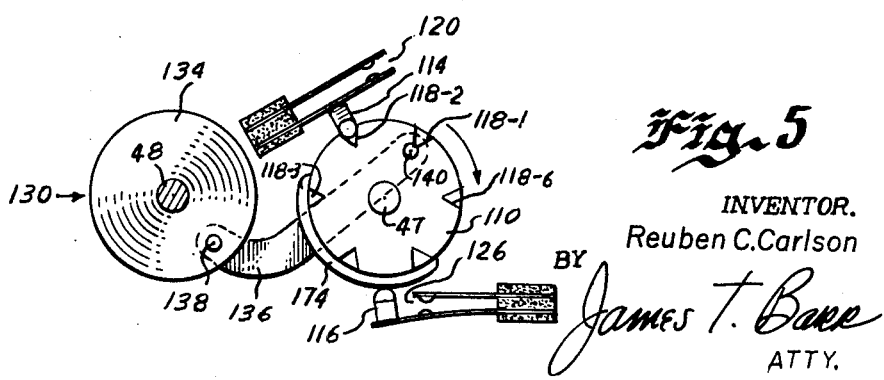

Specifically, the crank mechanism 49 comprises a crank arm 136 connected at one end to a cam wheel 112 that is actually part of the volume programming arrangement 51. The arm 136 is fixedly secured to the idler shaft 47 at its one end and to a friction clutch 130 at its other end. The clutch 130 comprises a disc 132 suitably secured to the shaft 48 and a disc 134 frictionally secured to the disc 132. The desired movement of the potentiometer shaft 48 is obtained by virtue of the generally J-shaped configuration of the crank arm 136. As shown in FIG. 2, the left end of the crank arm 136 is freely mounted on a pivot pin 138 suitably fastened to the disc 134, while the right end of the crank arm 136 is freely mounted on a pivot pin 140 suitably secured to the cam wheel 112. The pivot pins 138 and 140 are located respectively adjacent to the peripheries of the cam wheel 112 and the disc 134. Accordingly, by orienting the J-shaped crank arm 136 as shown in FIG. 2, the potentiometer shaft 48 moves clockwise 120 degrees and counterclockwise 120 degrees each time the idler shaft 47 rotates 360 degrees. Specifically, FIG. 2 illustrates the position of the crank mechanism 138 when the potentiometer shaft 48 is on low volume at the end of its 120 degree counterclockwise movement, also the position shown in FIG. 1. FIG. 3 illustrates the crank mechanism 138 in the high volume position at the end of its clockwise 120 degree movement. FIGS. 4 and 5 illustrate the crank mechanism 138 in the off and mute positions, which are encountered on the return or counterclockwise movement of the potentiometer shaft 48. Two intermediate volume positions encountered on clockwise movement between low and high are not shown. Hence, in spite of the fact that the idler shaft 47 rotates 360 degrees, the potentiometer shaft 48 remains within its operative range of 120° and damage to potentiometer PT-109 is prevented.

Considering now in greater detail the volume programming arrangement 51, the volume potentiometer shaft 48 is rotated under the control of the programming arrangement 51 and is stopped in discrete spaced apart operative positions to produce one of the plurality of discrete sound levels for the television receiver. More specifically, the programming arrangement 51 comprises a pair of cam wheels 110 and 112 fixedly secured together and to the idler shaft 47 beneath the gear 108. The cam wheel 110 coacts with a cam follower 114 for the purpose of providing a holding circuit for the motor 38, while the cam wheel 112 coacts with a cam follower 116 to turn the loudspeaker 17 off when the potentiometer shaft 48 is moving in its counterclockwise direction from a high level to a low level. Referring now specifically to the cam wheel 110, it comprises a generally flattened disc having a plurality of wedge-shaped recesses 118 spread apart along its periphery. The recesses are referred to collectively as 118 and individually as 118–1 through 118–6 corresponding to the following sound conditions: off, mute, low, medium-low, medium, and high. In response to successive ultra-sonic signals, the peripheral recesses 118–1 through 118–6 sequentially coact with the cam follower 114 which is suitably biased toward the idler shaft 47 into engagement with the periphery of the cam 110. As described in detail hereafter, the cam follower 114 controls a pair of contacts 120 which are located in the holding circuit for the motor 38.

Assuming that prior to transmission of a given ultrasonic signal the programming arrangement 51 is in the position illustrated in FIGS. 1 and 2 and the potentiometer shaft 48 is in its "low" position, the cam follower 114 is then seated in the recess 118–3 and its associated contacts 120 are open. Assuming further that the given ultra-sonic signal causes the idler shaft 47 to rotate in a clockwise direction under the control of the motor 38, the cam wheel 110 is likewise caused to rotate in a clockwise direction. Hence, the cam follower 114 is cammed outwardly onto the periphery of the wheel 110, thereby closing the contacts 120 and completing a holding circuit for the motor 38, as follows: ground, contacts 120, conductor 122, conductor 79, motor control winding 38a, A.C. source 80, and ground. Accordingly, the above-described holding circuit energizes the motor control winding 38a independently of the above-described energizing circuit controlled by the volume relay 42 and its associated contacts 76. After the holding circuit is completed, the transmission of the ultra-sonic signal is terminated, with the result that the volume relay 42 is de-energized and its associated contacts 76 are opened. The opening of the contacts 76 opens the energizing circuit for the motor 38, but since the above-described holding circuit is completed under the control of the programming arrangement 51, the motor control winding 38a remains energized and the motor 38 continues to drive the gear train 56, the idler shaft 47, and the volume potentiometer shaft 48.

Thus, the potentiometer shaft 48 is driven counterclockwise under the control of the motor 38, and this movement continues until the peripheral recess 118–4 moves opposite to the cam follower 114. At this time, the cam follower 114 is biased into the recess 118–4, whereby the contacts 120 are opened and the above-described holding circuit for the motor 38 is broken. Thus, the motor 38 is de-energized under the control of the programming arrangement 51 and the drive pinion 94 moves axially downwardly to break the driving connection between the motor 38 and the volume potentiometer shaft 48, with the result that the movement of the volume potentiometer shaft 48 is arrested. Similarly, subsequent ultra-sonic signal transmissions will move the shaft 48 into positions wherein the cam follower 114 is in recess 118–5, then 118–6, and finally 118–1. In this position (see FIG. 4), a suitable switch (not shown) associated with the volume potentiometer shaft 48 is actuated to turn the components of the television receiver off, with, of course, the exception of the remote control system, which remains on until turned off by other means (not shown).

In order to silence the audio of the receiver 20 when the volume is being turned from its high condition through its off and mute conditions to its low condition, i.e. when the potentiometer shaft 48 moves counterclockwise from the upper end of its range back to the lower end of its range, the cam 112 and associated cam follower 116 function to open the circuit of the voice coil of the loudspeaker 17. More specifically, the cam wheel 112 comprises a thin disc having a peripheral camming portion 174, as best seen in FIGS. 2, 3, and 4. Immediately after the shaft 47 moves from the position shown in FIG. 3 towards the position shown in FIG. 4, the camming portion 174 of the cam wheel 112 moves into engagement with the cam follower 116, with the result that a pair of contacts 126 are opened to interrupt the audio signal to the voice coil of the loudspeaker 17. Accordingly, during the return, or counterclockwise travel of the potentiometer shaft 48, no audio is produced by the receiver 20. As shown in FIG. 4, the contacts 126 are open under the control of the cam follower 116 when potentiometer PT–109 is in its off position and, as shown in FIG. 5, the contacts 126 are still open when potentiometer PT–109 is in its mute position. However, before potentiometer PT–109 reaches its low position, the camming portion 174 disengages the cam follower 116, with the result that the contacts 126 close and the audio signal is again applied to the voice coil of the loudspeaker 17. As shown, the camming portion 174 is so configured that no engagement is obtained with the cam follower 116 during movement of the potentiometer shaft 48 while potentiometer PT–109 is adjusted into and intermediate its low, medium-low, medium, and high positions. By this arrangement, the listener of the television set is spared the discomfort of unnecessarily listening to the audio as it changes from a high level to a low level.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A system for moving a rotary control member through a plurality of predetermined angular positions within an operative arc of less than 180° comprising means for generating a control signal, circular camming means having a plurality of spaced apart camming positions, driving means responsive to said signal for initiating rotation of said circular camming means, means for maintaining said rotation between adjacent ones of said camming positions, a crank member, means for rendering said driving means inoperative opposite each successive one of said positions thereby to halt rotation of said camming means and stop said rotary control member in corresponding successive ones of said predetermined angular positions, said rotary control member being situated adjacent said circular camming means, said crank member being of such length and being affixed to said rotary control member and to said circular camming means at such radii that it transmits rotary movement of said camming means to said rotary control member as reciprocal movement.

2. A system for moving a rotary control member through a plurality of predetermined angular positions comprising means for generating a control signal, circular camming means, cam follower means operatively associated with said circular camming means, driving means for imparting rotation to said circular camming means, first control means responsive to said control signal for initiating rotation of said circular camming means, second control means responsive to said cam follower means for maintaining said rotation between adjacent ones of a plurality of detented positions of said circular camming means, each of said detented positions corresponding to one of said angular positions, said second control means being adapted to halt said rotation opposite each of said detented positions, and a crank, one end of said crank being pivotally attached to said rotary control member at a first radial distance from the center of rotation of said member, the other end of said crank being pivotally attached to said circular camming means at a second radial distance from the center of rotation of said camming means, said first radial distance being greater than said second radial distance and said rotary control member being so spaced from said circular camming means that continuous rotary movement of said circular camming means is translated to said rotary control member as reciprocal motion within an arc of less than 180°.

3. A system for moving a rotary control member through a plurality of predetermined angular positions within an operative arc of less than 180° comprising means for generating a control signal, circular camming means having a plurality of spaced apart camming positions, driving means responsive to said signal for initiating rotation of said circular camming means, means for maintaining said rotation between adjacent ones of said camming positions, a crank member, means for rendering said driving means inoperative opposite each successive one of said positions thereby to halt rotation of said camming means and stop said rotary control member in corresponding successive ones of said predetermined angular positions, said rotary control member being situated adjacent said circular camming means, said crank member being of such length and being affixed to said rotary control member and to said circular camming means at such radii that it transmits rotary movement of said camming means to said rotary control member as reciprocal movement, a shaft, said rotary control member being freely journaled on said shaft, a clutch plate affixed to said shaft for frictional rotation with said rotary control member, and a potentiometer the operative condition of which is determined by the angular position of said shaft, whereby the range of operation of said potentiometer may be altered by changing the relative angular relationship between said clutch member and said rotary control member, and whereby said potentiometer is protected from damage due to movement outside of its maximum operative range by clutch slippage occurring above a given torque level.

4. A system for moving a rotary control member through a plurality of predetermined angular positions comprising means for generating a control signal, circular camming means, cam follower means operatively associated with said circular camming means, driving means for imparting rotation to said circular camming means, first control means responsive to said control signal for initiating rotation of said circular camming means, second control means responsive to said cam follower means for maintaining said rotation between adjacent ones of a plurality of detented positions of said circular camming means, each of said detented positions corresponding to one of said angular positions, said second control means being adapted to halt said rotation opposite each of said detented positions, and a crank, one end of said crank being pivotally attached to said rotary control member at a first radial distance from the center of rotation of said member, the other end of said crank being pivotally attached to said circular camming means at a second radial distance from the center of rotation of said camming means, said first radial distance being greater than said second radial distance and said rotary control member being so spaced from said circular camming means that continuous rotary movement of said circular camming means is translated to said rotary control member as reciprocal motion within an arc of less than 180°, second camming means affixed to said circular camming means, second follower means associated with said second camming means, utilization means controlled by said rotary control member, and third control means operable by said second cam follower means throughout a preselected arc of said rotation to render said utilization means inoperative during rotation within said arc.

5. A system for moving a rotary control member through a plurality of predetermined angular positions within an operative arc of less than 180° comprising means for generating a control signal, circular camming means having a plurality of spaced apart camming positions, driving means responsive to said signal for initiating rotation of said circular camming means, means for maintaining said rotation between adjacent ones of said camming positions, a crank member, means for rendering said driving means inoperaitve opposite each successive one of said positions thereby to halt rotation of said camming means and stop said rotary control member in corresponding successive ones of said predetermined angular positions, said rotary control member being situated adjacent said circular camming means, said crank member being of such length and being affixed to said rotary control member and to said circular camming means at such radii that it transmits rotary movement of said camming means to said rotary control member as reciprocal movement, said driving means being adapted to impart rotation selectively in either of two directions, and means responsive to said control signal for selecting one of said directions.

6. A potentiometer control for controlling a potentiometer comprising first rotary camming means having a plurality of predetermined angular positions, means for rotating said camming means between said positions, a potentiometer shaft for determining the operative condition of said potentiometer, clutch means having an input member and an output member, connecting rod means pivotally connected to said camming means and said input member, said output member drivingly connected to said shaft.

7. A control system selectively operable by a plurality of energy signals radiating from remotely positioned transmitter means for controlling electrical circuit means which performs a plurality of control functions each having a plurality of operating conditions, said system comprising prime mover means, output means for said prime mover means, a rotatable element for performing one of said control functions, driving connection means operable to interconnect said output means and said rotatable element, discriminating means responsive to a first one of said energy signals for energizing said prime mover means and operating said driving connection means, said driving connection means including a crank mechanism for effecting limited forward and backward rotary movement of said rotatable element during a continuous unidirectional movement of said output means, whereby said rotatable element is maintained within its angular operative range, and a programming arrangement drivingly connected to said driving connection means, said rotatable element being drivable by said prime mover means independently of said discrminating means under the control of said programming arrangement.

8. A control system selectively operable by a plurality of energy signals radiating from remotely positioned transmitter means for controlling electrical circuit means which performs a plurality of control functions each having a plurality of operating conditions, said system comprising prime mover means having uni-directional movement, output means for said prime mover means, a rotary control member for performing a first one of said control functions, drive connection means operable to interconnect said output means and said rotary control member for moving said rotary control member through a plurality of predetermined angular positions within an operative arc less than 180° whereby said rotary control member is maintained within its operative range irrespective of the continuous uni-directional movement of said prime mover means, means responsive to a first one of said energy signals for energizing said prime mover means and operating said drive connection means, said drive connection means including circular camming means having a plurality of spaced apart camming positions initially rotated responsive to said output means, means for maintaining said rotation between adjacent ones of said camming positions, a crank member, means to render said prime mover means inoperative opposite each successive one of said camming positions thereby to halt rotation of said camming means and stop said rotary control member in corresponding successive ones of said predetermined angular positions, said rotary control member being situated adjacent said circular camming means, said crank member being of such length and being affixed to said rotary control member and to said circular camming means at such radii that it transmits rotary movement of said camming means to said rotary control member as reciprocal movement.

9. A control system operable by a plurality of energy signals radiating from remotely positioned transmitter means for controlling electrical circuit means which performs a plurality of control functions each having a plurality of operating conditions, said system comprising prime mover means having unidirectional movement, output means for said prime mover means, a rotary control member for performing a first one of said control functions, drive connection means operable to interconnect said output means and said rotary control member for moving said rotary control member through a plurality of predetermined angular positions within an operative arc less than 180°, whereby said rotary control member is maintained within its operative range irrespective on the continuous uni-directional movement of said prime mover means, means responsive to a first one of said energy signals for energizing said prime mover means and operating said drive connection means, said drive connection means including circular camming means having a plurality of spaced apart camming positions initially rotated responsive to said output means, means for maintaining said rotation between adjacent ones of said camming positions, a crank member, means to render said prime mover means inoperative opposite each successive one of said positions thereby to halt rotation of said camming means and stop said rotary control member in corresponding successive ones of said predetermined angular positions, said rotary control member being situated adjacent said circular camming means, said crank member being of such length and being affixed to said rotary control member and to said circular camming means at such radii that it transmits rotary movement of said camming means to said rotary control member as reciprocal movement, a second rotary control member for controlling a second one of said control functions, and second drive connection means operable to interconnect said output means and said second rotary control member, and means responsive to a second one of said energy signals to energize said prime mover means and to operate said second drive connection means, said rotary control member having a plurality of discrete angular positions through which it is driven by said second drive connection means in a continuous uni-directional manner.

References Cited by the Examiner
UNITED STATES PATENTS

| | | | |
|---|---|---|---|
| 2,860,749 | 11/58 | Keltz | 192—33 |
| 2,930,955 | 3/60 | Bourget et al. | 318—460 X |
| 3,020,457 | 2/62 | Kelley | 318—16 |

ORIS L. RADER, *Primary Examiner.*

MILTON O. HIRSHFIELD, *Examiner.*